(12) United States Patent
Hasegawa

(10) Patent No.: US 9,800,445 B2
(45) Date of Patent: *Oct. 24, 2017

(54) TRANSMISSION APPARATUS, RECEPTION APPARATUS, AND COMMUNICATION SYSTEM

(71) Applicant: MITSUBISHI ELECTRIC CORPORATION, Chiyoda-ku (JP)

(72) Inventor: Fumihiro Hasegawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/909,928

(22) PCT Filed: Aug. 1, 2014

(86) PCT No.: PCT/JP2014/070372
§ 371 (c)(1),
(2) Date: Feb. 3, 2016

(87) PCT Pub. No.: WO2015/019964
PCT Pub. Date: Feb. 12, 2015

(65) Prior Publication Data
US 2016/0182268 A1 Jun. 23, 2016

(30) Foreign Application Priority Data

Aug. 6, 2013 (JP) ................. 2013-163662

(51) Int. Cl.
*H04L 27/04* (2006.01)
*H04L 27/26* (2006.01)
*H04L 27/36* (2006.01)

(52) U.S. Cl.
CPC ...... *H04L 27/2607* (2013.01); *H04L 27/2636* (2013.01); *H04L 27/36* (2013.01)

(58) Field of Classification Search
CPC .. H04L 27/2607; H04L 27/2636; H04L 27/36
(Continued)

(56) References Cited

U.S. PATENT DOCUMENTS 8,923,339 B2 12/2014 Strumpf
9,071,391 B2 6/2015 Noh et al.
(Continued)

FOREIGN PATENT DOCUMENTS

CN 105009490 A 10/2015
EP 2966795 A1 1/2016
(Continued)

OTHER PUBLICATIONS

Fumihiro Hasegawa, et al., "A novel Out-Of-Band Power Suppression Method for SC-OFDM", Proceedings of the 2013 IEICE General Conference, Mar. 5, 2013, 2 pages.
(Continued)

*Primary Examiner* — Siu Lee
(74) *Attorney, Agent, or Firm* — Oblon, McClelland, Maier & Neustadt, L.L.P.

(57) ABSTRACT

A transmission apparatus that transmits a block signal that includes a plurality of data symbols, includes: a symbol generation unit that generates data symbols; a fixed-symbol arrangement unit that generates a block symbol by arranging data symbols and fixed symbols such that the fixed symbols are inserted at predetermined positions in a block signal; a time-frequency conversion unit that converts the block symbol to a frequency domain signal that includes N samples; an interpolation processing unit that performs interpolation processing on the frequency domain signal; and a CP insertion unit that generates the block signal by inserting a Cyclic Prefix into a signal that has undergone the interpolation processing.

15 Claims, 16 Drawing Sheets

(58) Field of Classification Search
USPC ........ 375/295, 316, 259, 260, 285, 296, 346
See application file for complete search history.

(56) References Cited

U.S. PATENT DOCUMENTS

| | | | |
|---|---|---|---|
| 9,226,232 | B2 | 12/2015 | Kwan |
| 9,680,681 | B2 | 6/2017 | Hasegawa et al. |
| 2010/0039927 | A1 | 2/2010 | Noh et al. |
| 2010/0061224 | A1 | 3/2010 | Noh et al. |
| 2011/0150128 | A1 | 6/2011 | Yamazaki |
| 2012/0099681 | A1 | 4/2012 | Yoshimochi et al. |
| 2012/0166119 | A1 | 6/2012 | Nentwig et al. |
| 2012/0307743 | A1 | 12/2012 | McGowan et al. |
| 2013/0142177 | A1* | 6/2013 | Nentwig ............ H04W 56/001 370/336 |
| 2016/0013963 | A1* | 1/2016 | Hasegawa .......... H04L 27/2602 375/295 |
| 2016/0277936 | A1* | 9/2016 | Hasegawa ................ H04J 11/00 |

FOREIGN PATENT DOCUMENTS

| | | |
|---|---|---|
| JP | 2012-090080 A | 5/2012 |
| WO | 2010/055639 A1 | 5/2010 |
| WO | 2014/136726 A1 | 9/2014 |

OTHER PUBLICATIONS

Fumihiro Hasegawa, et al., "A novel Out-Of-Band Spectrum Suppression Method without Data Loss", IEICE Technical Report, vol. 113, No. 194, RCS2013-133, Aug. 22, 2013, 7 pages.

Nevio Benvenuto, et al. "Single Carrier Modulation With Nonlinear Frequency Domain Equalization : An Idea Whose Time Has Come-Again", Proceedings of the IEEE, Jan. 2010, vol. 98, No. 1, pp. 69-96.

John A. C. Bingham, "Multicarrier Modulation for Data Transmission: An Idea Whose Time Has Come", IEEE Communications Magazine, May 1990, vol. 28, No. 5, pp. 5-14.

Laurie B. Nelson, et al., "Iterative Multiuser Receivers for CDMA Channels: An EM-based Approach", IEEE Transactions on Communications, Dec. 1996, vol. 44, No. 12, pp. 1700-1710.

David C. Chu, "Polyphase Codes With Good Periodic Correlation Properties", IEEE Transactions on Information Theory, Jul. 1972, pp. 531-532.

Boaz Porat, "A Course in Digital Signal Processing" John Wiley & Sons, Inc., 1997, 25 pages.

Ivan Cosovic, et al., "Subcarrier Weighting: A Method for Sidelobe Suppression in OFDM Systems" IEEE Communications Letters, Jun. 2006, vol. 10, No. 6, pp. 444-446.

Jun Tan, et al., "Frequency-Domain Equalization for Continuous Phase Modulation", IEEE Transactions on Wireless Communications, Sep. 2005, vol. 4, No. 5, pp. 2479-2490.

Char-Dir Chung, "Spectrally Precoded OFDM", IEEE Transactions on Communications, Dec. 2006, vol. 54, No. 12, pp. 2173-2185.

Jaap van de Beek, et al., "N-Continuous OFDM", IEEE Communications Letters, Jan. 2009, vol. 13, No. 1, pp. 1-3.

International Search Report issued on Oct. 7, 2014 for PCT/JP2014/070372 filed on Aug. 1, 2014.

Extended European Search Report mailed Nov. 29, 2016 in European Application No. 14834934.3.

Combined Chinese Office Action and Search Report dated Jun. 27, 2017 in Chinese Patent Application No. 201480044597.8 (with English translation of the Office Action and English translation of Category of Cited documents).

Office Action dated Jul. 28, 2017 in co-pending U.S. Appl. No. 14/773,975.

* cited by examiner

TRANSMISSION APPARATUS, RECEPTION APPARATUS, AND COMMUNICATION SYSTEM

FIELD

The present invention relates to a transmission apparatus, a reception apparatus, and a communication system.

BACKGROUND

In digital communication systems, frequency selectivity and time variability in a transmission path arise because of multipath phasing caused by transmission signals being reflected by buildings or the like or Doppler variations caused by the movement of terminals. In such a multipath environment, a received signal becomes a signal in which a transmission symbol and a symbol arriving after a delay time interfere with each other.

For such a transmission path having frequency selectivity, a single carrier block transmission method has recently attracted attention in order to acquire the best receiving characteristics (see, for example, Non Patent Literature 1 listed below). A single carrier (SC) block transmission method can reduce the peak power compared with an OFDM (Orthogonal Frequency Division Multiplexing) transmission method, which is multi carrier (MC) block transmission (see, for example, Non Patent Literature 2 listed below).

With a transmitter that performs SC block transmission, measures against multipath phasing are taken by performing, for example, transmission as follows. First, after generating a PSK (Phase Shift Keying) signal or a QAM (Quadrature Amplitude Modulation) signal, which are digital modulation signals, in a "Modulator", the digital modulation signal is converted to a time domain signal by a precoder and an IDFT (Inverse Discrete Fourier Transform) processing unit. Thereafter, as a measure against multipath phasing, a CP (Cyclic Prefix) is inserted by a CP insertion unit. The CP insertion unit copies a predetermined number of samples from the end of the time domain signal and adds the samples to the head of the transmission signal. In addition to this method, as a measure against multipath phasing, ZP (Zero Padding: zero insertion), in which zero is inserted into the front portion or the end portion of data, is performed.

Furthermore, in order to reduce the transmission peak power, in a transmitter that performs SC transmission, a precoder typically performs DFT (Discrete Fourier Transform) processing.

CITATION LIST

Non Patent Literatures

Non Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceeding of the IEEE, vol. 98, no. 1, January 2010, pp. 69-96.
Non Patent Literature 2: J. A. C. Bingham, "Multicarrier Modulation for Data Transmission: An idea Whose Time Has Come", IEEE Commun. Mag., vol. 28, no. 5, May 1990, pp. 5-14.

SUMMARY

Technical Problem

According to the conventional SC block transmission technique described above, the transmission peak power is reduced while the effect of multipath phasing is reduced. However, with the SC block transmission, the phase and amplitude become discontinuous between SC blocks; therefore, out-of-band spectrum or out-of-band leakage occurs. Because out-of-band spectrum causes interference with an adjacent channel, it is necessary to reduce the out-of-band spectrum. Furthermore, in typical communication systems, a spectral mask is defined and it is necessary to reduce the out-of-band spectrum such that the mask is satisfied.

The present invention has been achieved in view of the above, and an object of the present invention is to provide a transmission apparatus, a reception apparatus, and a communication system that can reduce out-of-band spectrum.

Solution to Problem

In order to solve the above problems and achieve the object, an aspect of the present invention is a transmission apparatus that transmits a block signal that includes N (N is an integer of one or larger) data symbols, including: a data-symbol generation unit that generates a data symbol; a symbol arrangement unit that generates a block symbol by arranging the data symbol and F (F is an integer of two or larger) same-quadrant symbols, which become signal points in a same quadrant in a complex plane, such that the same-quadrant symbols are inserted at predetermined positions in a block signal; a time-frequency conversion unit that converts the block symbol to a frequency domain signal that includes N samples; an interpolation processing unit that performs interpolation processing on the frequency domain signal; and a CP insertion unit that generates the block signal by inserting a Cyclic Prefix into a signal that has undergone the interpolation processing.

Advantageous Effects of Invention

According to the present invention, an effect is obtained where out-of-band spectrum can be reduced.

DESCRIPTION OF EMBODIMENTS

Exemplary embodiments of a transmission apparatus, a reception apparatus, and a communication system according to the present invention will be explained below in detail with reference to the drawings. The present invention is not limited to the embodiments.

First Embodiment

Figure 1:
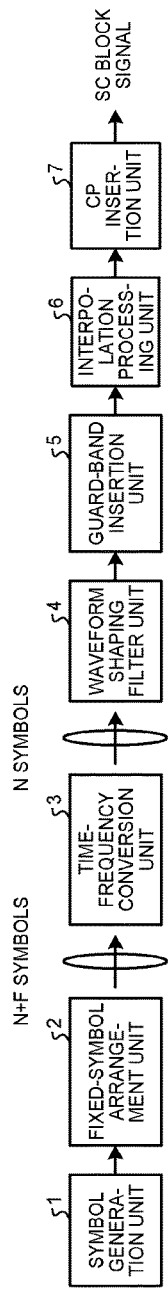
FIG. 1 is a diagram illustrating an example of a functional configuration of a transmission apparatus according to a first embodiment.

FIG. 1 is a diagram illustrating an example of a functional configuration of a transmission apparatus according to a first embodiment of the present invention. As illustrated in FIG. 1, the transmission apparatus according to the present embodiment includes a symbol generation unit 1 (data-symbol generation unit), a fixed-symbol arrangement unit (symbol arrangement unit) 2, a time-frequency conversion unit 3, a waveform shaping filter unit 4, a guard-band insertion unit 5, an interpolation processing unit 6, and a CP insertion unit 7.

The symbol generation unit 1 generates a data symbol (for example, a PSK (Phase Shift Keying) symbol or a QAM (Quadrature Amplitude Modulation) symbol). The fixed-symbol arrangement unit 2 arranges preassigned fixed symbols at predetermined positions between data symbols to generate a block symbol (symbols for one block consisting of data symbols and fixed symbols).

Figure 2:
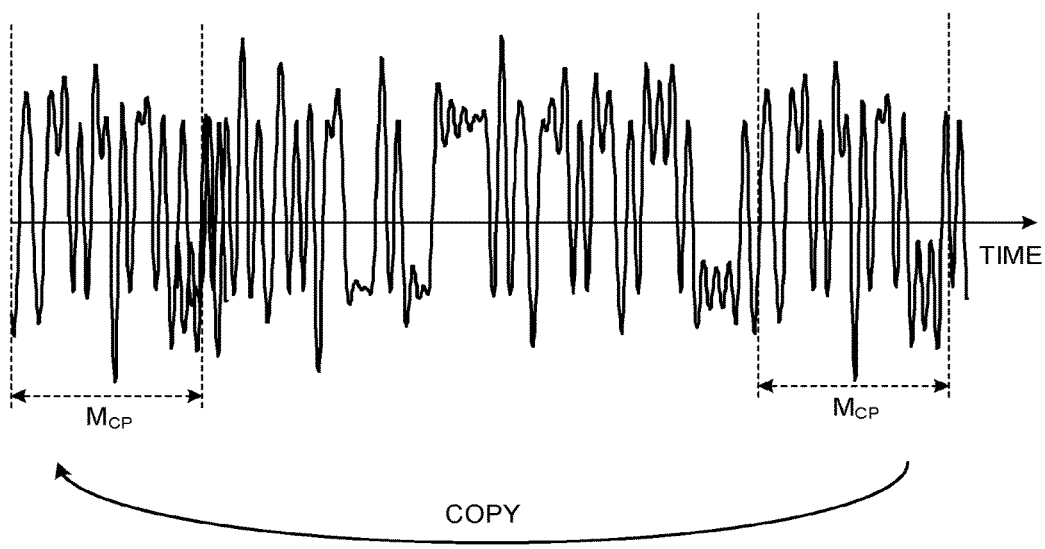
FIG. 2 is a diagram illustrating an example of CP insertion.

The time-frequency conversion unit 3 converts a time domain signal output from the fixed-symbol arrangement unit 2 to a frequency domain signal. The waveform shaping filter unit 4 performs filtering processing of removing signals other than a signal in a desired frequency domain on the frequency domain signal. The guard-band insertion unit 5 performs guard-band insertion processing on the frequency domain signal that has undergone the filtering processing. The interpolation processing unit 6 performs interpolation processing on the frequency domain signal that has undergone the guard-band insertion processing and converts the frequency domain signal that has undergone the interpolation processing to a time domain signal. The CP insertion unit 7 inserts a CP into the time domain signal output from the interpolation processing unit 6. FIG. 2 is a diagram illustrating an example of CP insertion. The CP insertion unit 7 copies the last $M_{CP}$ symbols in a block and arranges them at the head of the block. The signal into which the CP has been inserted is transmitted as an SC block signal (block signal). The interpolation processing unit 6 can use any interpolation processing method as long as the point that is interpolated so as to be inserted between the last symbol in a block and the first symbol in a block is set as a last sample in a block in the time domain signal after the interpolation processing. That is, it is satisfactory if the interpolation processing is such that the last sample after the interpolation processing (point that is added by interpolation) is a point that is smoothly connected to the value of the first sample in a block in the time domain signal after the interpolation processing. Typically, in the frequency domain, a guard band is inserted in order to prevent the signal quality from deteriorating because of interference from adjacent signals.

Figure 3:
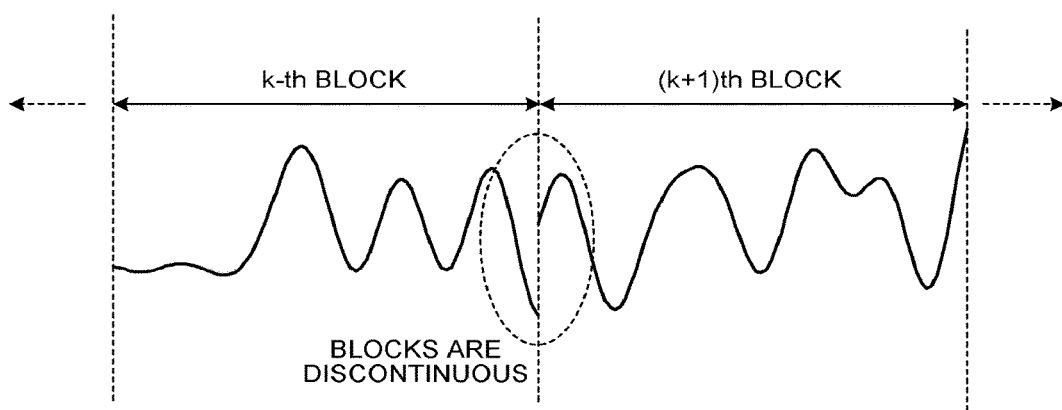
FIG. 3 is a diagram illustrating an example in which the phase and amplitude become discontinuous between SC blocks in a conventional SC block transmission.

Conventional SC block transmission is described here. In the SC block transmission, the phase and amplitude become discontinuous between SC blocks. FIG. 3 is a diagram illustrating an example in which the phase and amplitude become discontinuous between SC blocks in the conventional SC block transmission. In the example in FIG. 3, out-of-band spectrum or out-of-band leakage occurs between the k-th (k is an integer) block and the (k+1)th block. Such out-of-band spectrum interferes with an adjacent channel. In the present embodiment, out-of-band spectrum is reduced by inserting a fixed symbol between data symbols.

Figure 4:
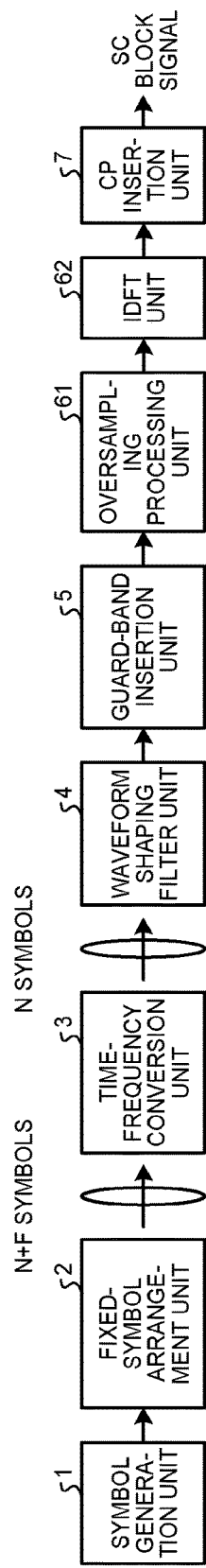
FIG. 4 is a diagram illustrating an example of the configuration of an interpolation processing unit according to the first embodiment.

FIG. 4 is a diagram illustrating an example of the configuration of the interpolation processing unit 6 according to the present embodiment. In FIG. 4, the interpolation processing unit 6, which includes an oversampling processing unit 61 and an IDFT unit 62, is exemplified. The configurations of the symbol generation unit 1, the fixed-symbol arrangement unit 2, the time-frequency conversion unit 3, the waveform shaping filter unit 4, the guard-band insertion unit 5, and the CP insertion unit 7 are similar to the configuration example illustrated in FIG. 1. The operations according to the present embodiment will be described with reference to the configuration example in FIG. 4.

It is assumed that the number of data symbols per block generated by the symbol generation unit 1 is N and the number of fixed symbols per block inserted by the fixed-symbol arrangement unit 2 is F. After the insertion of the fixed symbols, one block consists of (N+F) symbols.

Figure 5:
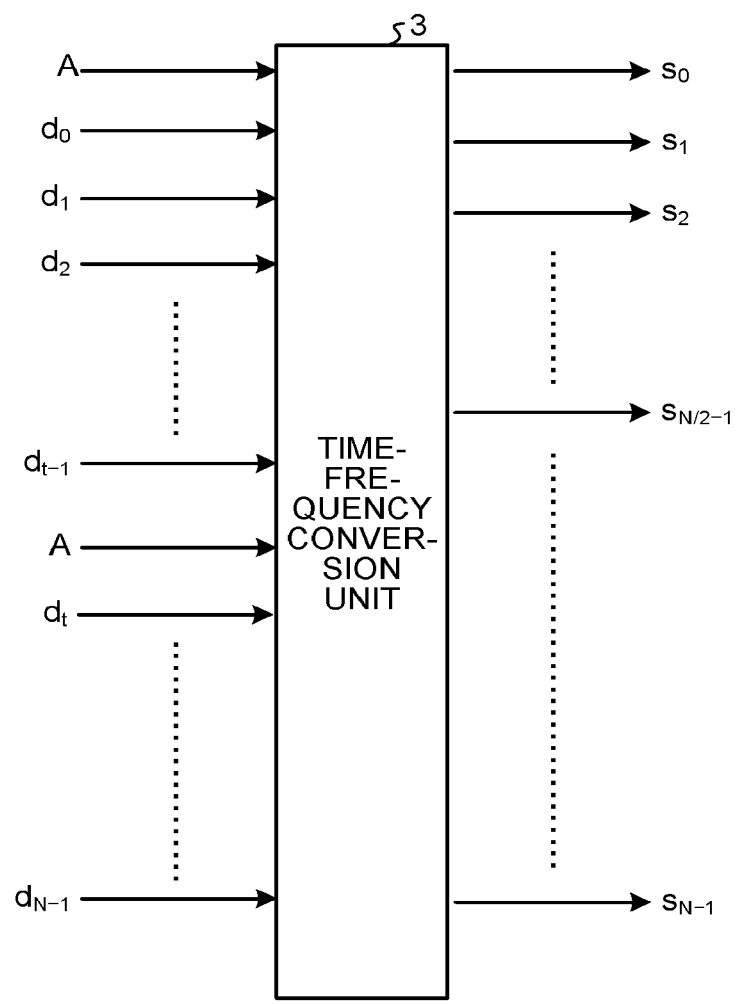
FIG. 5 is a diagram illustrating the relation between input and output of a time-frequency conversion unit.

The time-frequency conversion unit 3 converts the time domain signal that consists of (N+F) symbols to a frequency domain signal. FIG. 5 is a diagram illustrating the relation between input and output of the time-frequency conversion unit 3. In FIG. 5, "$d_i$" denotes the i-th data symbol, "A" denotes a fixed symbol, "$s_i$" denotes an output symbol, and the number of fixed symbols is two. Moreover, FIG. 5 illustrates an example in which the fixed symbol A is arranged immediately before $d_0$ and between $d_{r-1}$ and $d_r$. The number of symbols input to the time-frequency conversion unit 3 is N+2 and the number of symbols output from the time-frequency conversion unit 3 is N.

The time-frequency conversion processing performed by the time-frequency conversion unit 3 may be any processing as long as the time domain signal that consists of (N+2) symbols is converted to the frequency domain signal that consists of N symbols. A specific example of the time-frequency conversion processing is described below. When the number of fixed symbols is F, the time domain signal is converted to a frequency domain signal by using an N×(N+

F) matrix $W_P$ as described below. The (n,l)th element in the N×(N+F) matrix $W_P$ is represented by the following Equation (1).

$$[W_P]_{n,l} = e^{-j2\pi n l/(N+F)} \quad (1)$$

It is assumed that $0 \leq n \leq N-1$ and $0 \leq l \leq N+F-1$ are satisfied. The matrix in the above Equation (1) is represented by the following Equation (2).

$$W_P = [w_0, w_1, \ldots, w_{N+F-1}] \quad (2)$$

As an example, it is assumed that a vector representing a block symbol including two fixed symbols (input signal to be input to the time-frequency conversion unit 3) is $b = [A, d_0, d_1, \ldots, d_{t-1}, A, d_t, \ldots, d_{N-1}]^T$. A vector s representing a frequency domain signal obtained by performing time-frequency conversion can be represented by the following Equation (3) by using the matrix $W_P$ in the above Equation (1). Although the equation in the case where power normalization is not performed is described for ease of description, power normalization may be performed. $[b]_n$ represents the n-th element in the vector b.

$$s = W_P b = \sum_{n=0}^{N+F-1} w_n [b]_n \quad (3)$$

Figure 6:
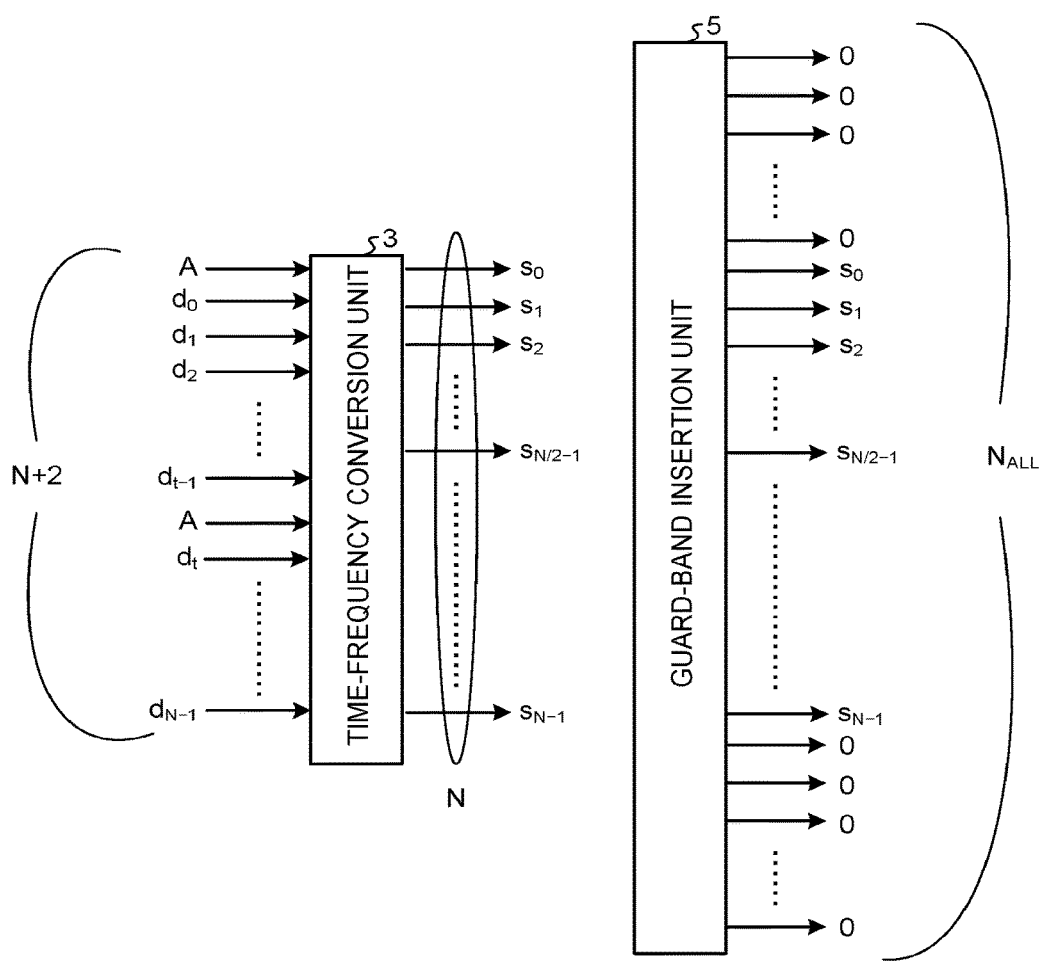
FIG. 6 is a diagram illustrating an example of guard-band insertion processing according to the first embodiment.

The waveform shaping filter unit 4 performs filtering processing of removing signals other than a signal in a desired frequency domain on the frequency domain signal vector s described above. The guard-band insertion unit 5 performs guard-band insertion processing on the frequency domain signal that has undergone the filtering processing. FIG. 6 is a diagram illustrating an example of the guard-band insertion processing according to the present embodiment. The guard-band insertion unit 5 inserts zeros on both sides of the signal in the frequency domain as the guard-band insertion processing. It is assumed that the total number of samples (points) after the insertion of zeros is $N_{ALL}$. FIG. 6 does not illustrate the waveform shaping filter unit 4 for ease of description.

h Specifically, the oversampling processing unit 61 performs the oversampling processing (processing of increasing the sampling rate, i.e., reducing the sampling intervals) by using a signal interpolation formula or the like described, for example, in "B. Porat, "A Course in Digital Signal Processing", John Wiley and Sons Inc., 1997" (hereinafter, referred to as Porat Literature). Oversampling is performed on the input signal such that sampling points per symbol becomes L. In other words, oversampling is performed such that the sampling rate becomes L times the sampling rate of the input. The oversampling rate is a value that indicates how many times the sampling rate after the oversampling is larger than the sampling rate of the input.

The IDFT unit 62 coverts the frequency domain signal that has undergone the oversampling processing to a time domain signal by performing IDFT processing. The IDFT processing is performed so that interpolated sample points are added between symbols. The interpolation point to be added immediately after the last symbol becomes a point that interpolates between the last symbol and the first symbol due to the cyclicity of the IDFT output explained in the Porat Literature.

Figure 7:
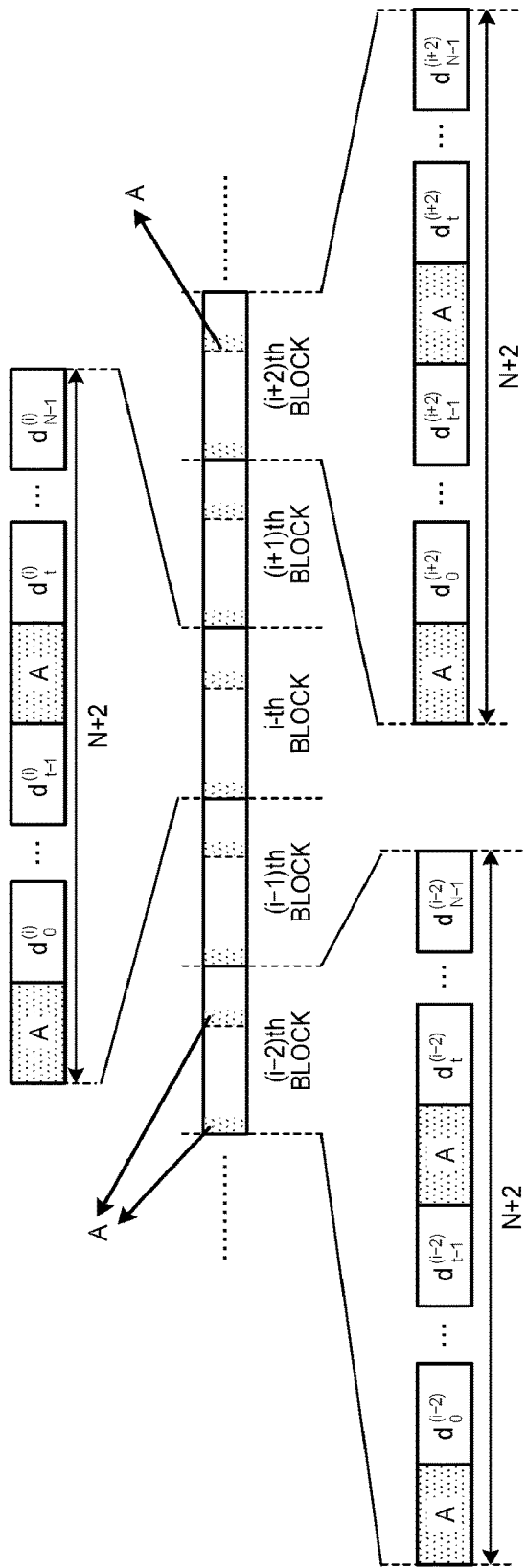
FIG. 7 is a diagram illustrating an example of the frame configuration according to the first embodiment.

FIG. 7 is a diagram illustrating an example of the frame configuration according to the present embodiment. As illustrated in FIG. 5, FIG. 7 illustrates the frame configuration when two fixed symbols A are respectively arranged immediately before $d_0$ and between $d_{t-1}$ and $d_t$. FIG. 7 illustrates a symbol configuration of each of the blocks when they are input to the time-frequency conversion unit 3. In the example in FIG. 7, the fixed symbols are arranged at the same positions in all the blocks within a given period. There is no limitation on the specific values and arrangement of the fixed symbols and the specific values and arrangement of the fixed symbols are not limited to the example in FIG. 7. In the present embodiment, the fixed symbol indicates a symbol with the phase and amplitude being fixed; however, a symbol in a specific quadrant may also be used. Note that, the same fixed symbols or fixed symbols having close phase and amplitude are arranged as the first fixed symbol (symbol arranged immediately before $d_0$) and the second fixed symbol (symbol arranged between $d_{t-1}$ and $d_t$).

In the examples in FIG. 5 and FIG. 7, the first symbol is the fixed symbol A, and the last symbol (interpolated point) output from the IDFT unit 62 has phase and amplitude continuously connected to the phase and amplitude of the fixed symbol A (phase and amplitude close to the phase and amplitude of the fixed symbol A). The sample point corresponding to the first fixed symbol (symbol arranged immediately before $d_0$) A and the sample point corresponding to the second fixed symbol (symbol arranged between $d_{t-1}$ and $d_t$) A that are output from the IDFT unit 62 have values close to that of the fixed symbol A. Accordingly, when CP insertion is performed such that the sample point corresponding to the fixed symbol (symbol arranged between $d_{t-1}$ and $d_t$) A is a sample at the head of each block after CP insertion, the phases of the last sample of an SC block and the first sample (fixed symbol) of the next SC block are smoothly connected. Therefore, continuity of the phases between blocks can be maintained and thus out-of-band spectrum can be reduced.

Figure 8:
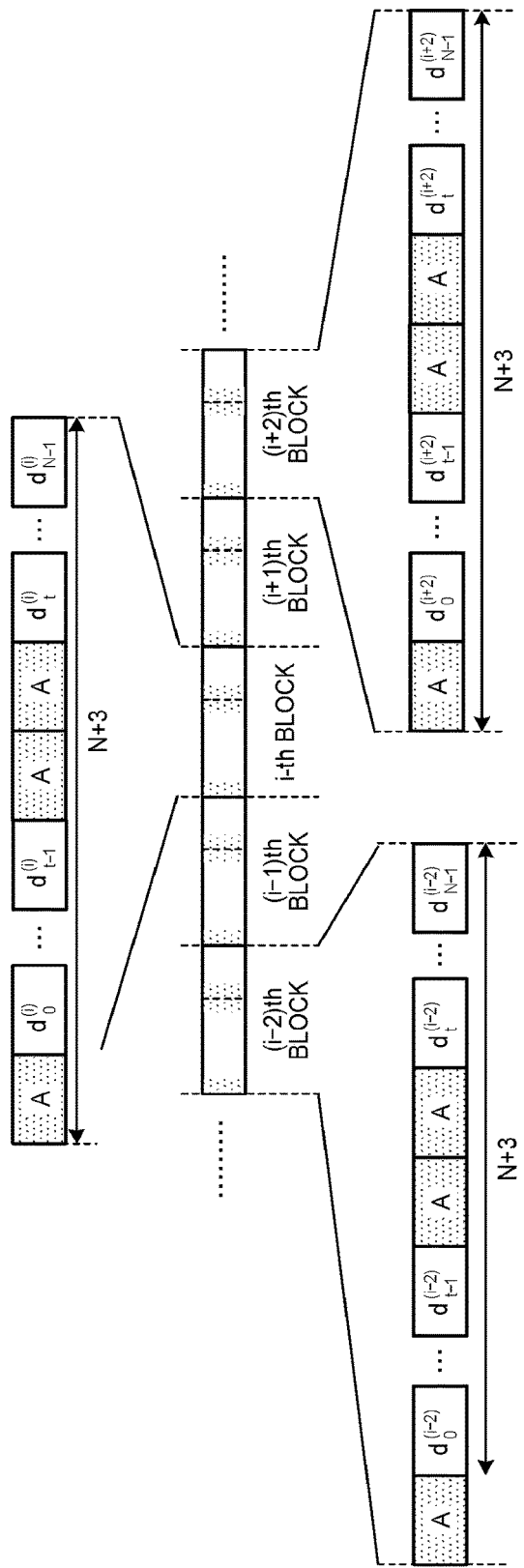
FIG. 8 is a diagram illustrating an example of another frame configuration according to the first embodiment.

The number of fixed symbols arranged in a block is not limited to two. FIG. 8 is a diagram illustrating another example of the frame configuration according to the present embodiment. As illustrated in FIG. 8, three fixed symbols may be arranged in a block such that the second fixed symbol and the third fixed symbol are continuous.

In order to perform CP insertion such that continuity of the phases between blocks can be maintained as described above, it is satisfactory if the phase at a predetermined position of a signal after the IDFT processing becomes close to a desired value. Specifically, the number of samples ($M_{CP}$ in FIG. 2) to be copied when CP insertion is performed is determined such that the phase at the head of a domain in each block to be copied when CP insertion is performed and the phase of the last sample point in each block are continuous.

In order to cause the phase at a predetermined position of a signal after the IDFT processing to be close to a desired value (to lock the phase at a predetermined position), for example, the position at which the fixed symbol is arranged is determined by using positive integers μ and χ that satisfy the following Equation (4).

$$\frac{\mu}{N_{ALL}} = \frac{\chi}{N+F} \quad (4)$$

For example, when N=22, $N_{ALL}$=32, and F=2, μ=4 and χ=3. Any value can be used for λ, and λ is a parameter that determines the CP length. The CP length is determined depending on the delay time due to the multipath that exists in the transmission path. In other words, when setting a value of λ, the CP length $M_{CP}$ is set such that $(N_{ALL}-\lambda\mu)L$ becomes longer than the maximum delay time in the transmission path. When the integer λ is $0 \leq \lambda \leq 7$ ($=N_{ALL}/\mu-1$), the combination that satisfies Equation (4) is λμ and λχ. In this case, when L=1 (no oversampling), the phase of the (λμ+1)th (when $0 \leq k \leq N+F-1$ is satisfied, k=λχ) sample from the IDFT unit 62 becomes close to the phase of the (λχ+1)th sample (symbol) input to the time-frequency conversion unit 3 (becomes the sample corresponding to the (λχ+1)th sample). Accordingly, when the fixed-symbol arrangement unit 2 arranges the fixed symbol A at the (λχ+1)th, the phase of the (λμ+1)th sample output from the IDFT unit 62 becomes close to the phase of the fixed symbol A. When the oversampling rate is L times, the phase of the (Lλμ+1)th sample output from the IDFT unit 62 becomes close to the phase of the (λχ+1)th sample in the block symbol. Accordingly, when the arrangement of the fixed symbol is determined, in order to cause the symbol at the head of a block after CP insertion (i.e., the first symbol of a portion to be copied in CP insertion) to become a sample corresponding to the fixed symbol, it is satisfactory if the fixed symbol A is arranged at the (λχ+1)th and the CP length $M_{CP}$ is set to $(N_{ALL}-\lambda\mu)L$.

Figure 9:
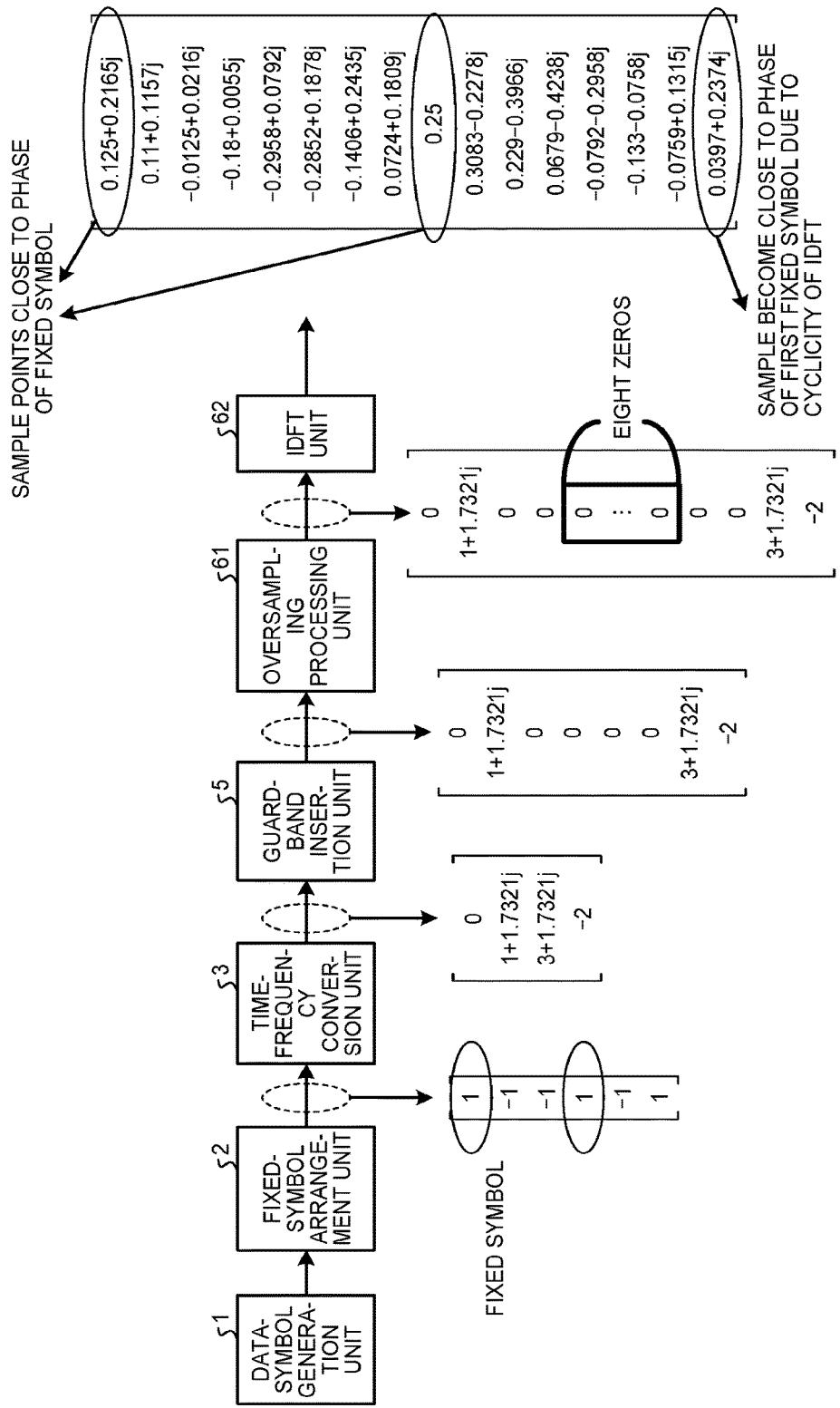
FIG. 9 is a diagram illustrating an example of data processing according to the first embodiment.

A specific example will be described with reference to the drawing. FIG. 9 is a diagram illustrating an example of data processing according to the present embodiment. FIG. 9 does not illustrate the waveform shaping filter unit 4 for ease of description. In the example in FIGS. 9, N=4, $N_{ALL}$=8, F=2, and L=2. As the guard-band insertion processing, zeros for two symbols are inserted on one side. Because the oversampling rate is twice, $N_{ALL}$ 8 zeros are inserted into the signal that has undergone the guard-band insertion processing. When the oversampling rate is L times, (L-1) $N_{ALL}$ zeros are inserted in the oversampling processing.

In the example in FIG. 9, μ=4 and χ=3. Accordingly, when λ=1, the first and the fourth (=(χ+1))th symbols in the block are set as a fixed symbol "A=+1". Although the value of A is set to "A=+1" in this example, any value can be used as the value of A of the fixed symbol. With reference to FIG. 9, it is found that the first and ninth symbols output from the IDFT unit 62 become close to the phase of the fixed symbol A. Moreover, it is found that the last sample of the IDFT output becomes close to the phase of the first symbol (fixed symbol) in the block symbol due to the cyclicity of the IDFT. In this example, when the CP length is set to eight ($=(N_{ALL}-\lambda\mu)L$) samples, the first sample in the CP portion becomes a value close to the phase of the fixed symbol; therefore, phase continuity can be maintained between blocks. The numerical values indicated as a specific example in FIG. 9 are indicated with up to four places of decimals for ease of description. The output of the time-frequency conversion unit 3 in FIG. 9 is illustrated in an order such that the points corresponding to $s_{N/2-1}$ and $s_{N/2}$ in FIG. 6 are located at both ends and $s_0$ and $s_{N-1}$ in FIG. 6 are located at the center. Therefore, zeros inserted at both ends in FIG. 6 in the guard-band insertion processing are inserted near the center in FIG. 9. Zero insertion in the oversampling processing is performed in a similar manner.

In the above example, an explanation has been given of an example where zero insertion is performed as the oversampling processing; however, the oversampling processing is not limited to zero insertion.

Figure 10:
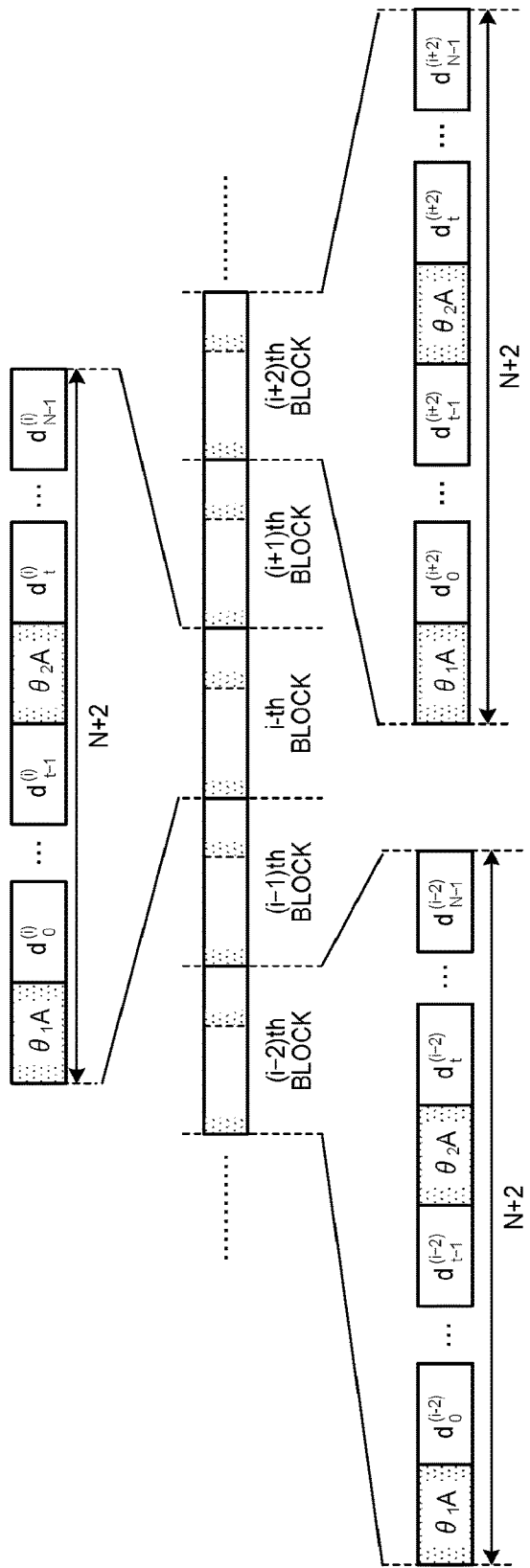
FIG. 10 is a diagram illustrating an example where different phase rotations are applied to two fixed symbols in a block.

In order to reduce out-of-band spectrum, phase rotation and amplitude adjustment may be performed on the fixed symbols A. FIG. 10 is a diagram illustrating an example where different phase rotations are applied to two fixed symbols in a block. In FIG. 10, $\theta_1 A$ and $\theta_2 A$ are fixed symbols with different phase rotation amounts. As illustrated in FIG. 10, in each of all the blocks within a given period, the same fixed symbols are arranged at the same positions in the block. Two fixed blocks in a block may have different amplitudes or may have different amplitudes and phases. The reason for applying phase rotation is as follows. When oversampling or guard-band adding processing is performed by performing zero insertion on the frequency, phase rotation is applied to the samples of the IDFT output. In order to maintain phase continuity between blocks, it is necessary to apply in advance, to each fixed symbol, phase rotation in a direction opposite to the phase rotation applied to each sample that is generated because of the oversampling and that is different depending on the fixed symbol insertion position. The sizes of the DFT and IDFT are different; therefore, when time-frequency conversion or IDFT processing is performed, the amplitude adjustment is performed such that the power of the final output signal does not change.

Moreover, in the present embodiment, an explanation has been given of an example where fixed symbols are arranged at predetermined positions; however, symbols (hereinafter, referred to as the same-quadrant symbols) that become signal points in the same quadrant in the complex plane (IQ plane) may be arranged instead of the fixed symbols. For example, in the example in FIG. 5, instead of two fixed symbols, two symbols (same-quadrant symbols) A and B in the same quadrant may be arranged.

Moreover, in the present embodiment, data symbols and fixed symbols are converted to a frequency domain signal to convert (N+F) pieces of data to N pieces of data in the frequency domain; however, (N+F) pieces of data may be converted to N pieces of data in the time domain.

As described above, in the present embodiment, the time domain signal obtained by inserting F fixed symbols into N data symbols is converted to the frequency domain signal that includes N samples, after performing the guard-band insertion processing, the oversampling processing is performed, the IDFT processing is performed, and then CP insertion is performed. The CP length is set such that the head of the domain to be copied when CP insertion is performed becomes a point close to the phase of a fixed symbol in the block symbol. Therefore, continuity of the phase between blocks can be maintained and thus out-of-band spectrum can be reduced.

In the present embodiment, the guard-band insertion processing is performed; however, the guard-band insertion processing may not be performed. Moreover, the present embodiment can be applied to the case where there is no CP and $M_{CP}$ is equal to zero. In such a case, F is set to be equal to one and one fixed symbol is arranged only immediately before $d_0$.

Second Embodiment

Figure 11:
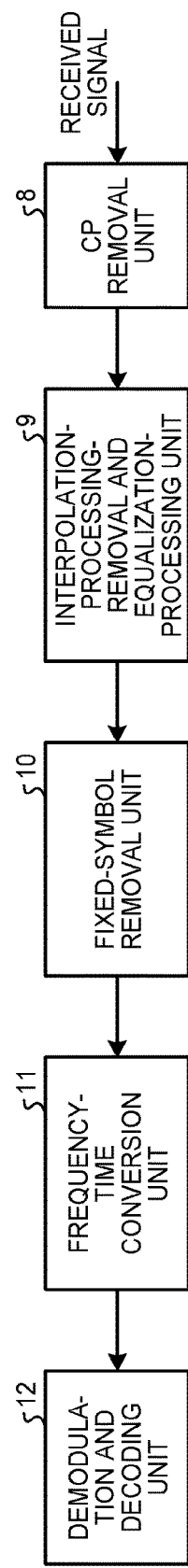
FIG. 11 is a diagram illustrating an example of the functional configuration of a reception apparatus according to a second embodiment.

FIG. 11 is a diagram illustrating an example of the functional configuration of a reception apparatus according to a second embodiment of the present invention. The reception apparatus according to the present embodiment receives SC block signals transmitted from the transmission apparatus described in the first embodiment.

As illustrated in FIG. 11, the reception apparatus according to the present embodiment includes a CP removal unit 8, an interpolation-processing-removal and equalization-processing unit 9, a fixed-symbol removal unit 10, a frequency-time conversion unit 11, and a demodulation and decoding unit 12. The CP removal unit 8 removes a CP from the received signal. The interpolation-processing-removal and equalization-processing unit 9 converts the reception signal to a frequency domain signal and performs equalization processing for the transmission path, and performs processing in the reverse direction to that performed by the interpolation processing unit 6 of the transmission apparatus. The fixed-symbol removal unit 10 removes fixed symbol (or same-quadrant symbol) components inserted at predetermined positions from the signal that is the output of the interpolation-processing-removal and equalization-processing unit 9, i.e., that has undergone the equalization processing, and that includes N symbols obtained by condensing F fixed symbols and N data symbols. The frequency-time conversion unit 11 converts the frequency domain signal from which the fixed symbols have been removed to a time domain signal. The demodulation and decoding unit 12 performs demodulation and decoding processing on the signal from which the fixed symbols have been removed.

Figure 12:
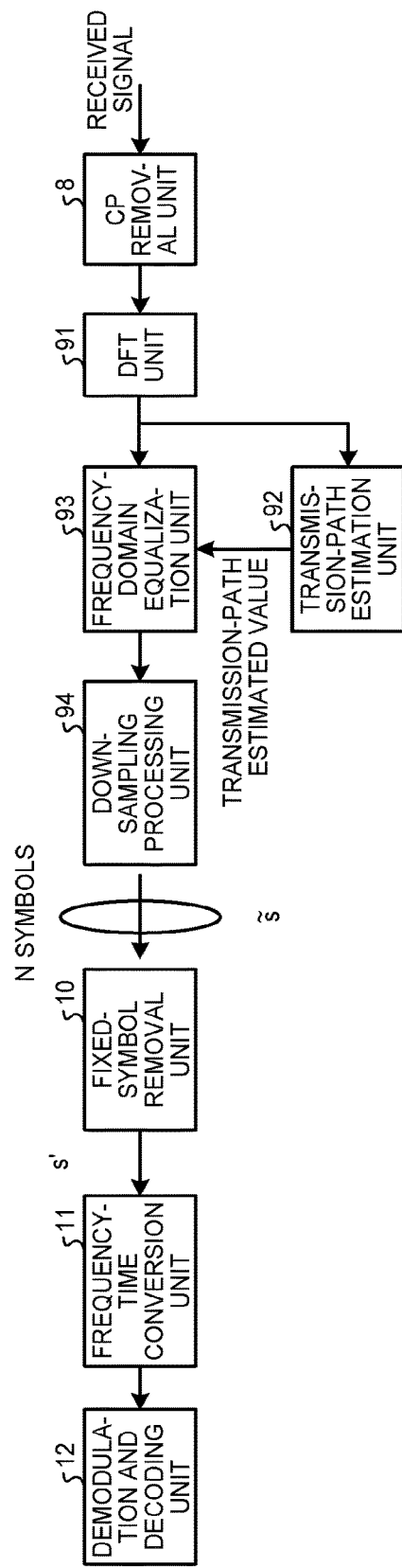
FIG. 12 is a diagram illustrating an example of the configuration of an interpolation-processing-removal and equalization-processing unit.

FIG. 12 is a diagram illustrating an example of the configuration of the interpolation-processing-removal and equalization-processing unit 9. The CP removal unit 8, the fixed-symbol removal unit 10, the frequency-time conversion unit 11, and the demodulation and decoding unit 12 are similar to those in the example in FIG. 11. In the example in FIG. 12, the interpolation-processing-removal and equalization-processing unit 9 includes a DFT unit 91, a transmission-path estimation unit 92, a frequency-domain equalization unit 93, and a downsampling processing unit 94.

The DFT unit 91 converts the received signal from which a CP has been removed to a frequency domain signal by performing DFT processing. The transmission-path estimation unit 92 estimates the transmission path on the basis of the frequency domain signal and inputs the transmission-path estimated value to the frequency-domain equalization unit 93. The frequency-domain equalization unit 93 performs the equalization processing on the basis of the frequency domain signal and the transmission-path estimation value. The downsampling processing unit 94 performs downsampling processing on the frequency domain signal that has undergone the equalization processing (for example, removing zeros from the positions where zero insertion is performed in the frequency domain in the transmission apparatus). At this point, zeros that are inserted during the guard-band insertion processing are also removed.

When the number of fixed symbols F is equal to two and the fixed-symbol insertion position is the first position (when $0 \leq k \leq N+F-1$ is satisfied, k=0) and the (x+1)th position (k=x), the matrix in Equation (1) excluding the columns corresponding to the fixed symbol insertion positions can be represented by the following Equation (5).

$$W'_P = [w_1, \ldots, w_{x-1}, w_{x+1}, \ldots, w_{N+F-1}] \quad (5)$$

The matrix in the above Equation (5) becomes an N☐N matrix. It is assumed that the signal represented by the following Equation (6) is a signal from which a CP has been removed and on which the equalization processing and the downsampling processing have been performed.

$$\tilde{s} = [s_0, s_1, \ldots, s_{N-1}]^T \quad (6)$$

At this point, in the frequency domain, fixed symbol components are removed as represented by the following Equation (7).

$$s' = \tilde{s} - w_0 A - w_x A \quad (7)$$

When phase rotation or amplitude adjustment is applied to the fixed symbols on the transmission side, the fixed symbols including phase-rotation or amplitude-adjustment processing are removed as represented by the following Equation (8).

$$s' = \tilde{s} - w_0 A - w_x \theta_2 A \quad (8)$$

Then, by using the matrix represented by the above Equation (5), the frequency-time conversion processing is performed and thus an estimated value $\hat{d}$ of the data symbol can be obtained as represented by the following Equation (9).

$$\hat{d} = [\hat{d}_0, \hat{d}_1, \ldots, \hat{d}_{N-1}]^T = (W'_P)^{-1} s' \quad (9)$$

The present embodiment can be applied to the case where there is no CP and $M_{CP}$ is equal to zero. In such a case, F is set to be equal to one and a fixed symbol is arranged only immediately before $d_0$. In such a case, the matrix in Equation (1) excluding the columns corresponding to the fixed-symbol insertion positions can be represented by the following Equation (10).

$$W'_P = [w_1, \ldots, w_{N+F-1}] \quad (10)$$

The fixed symbol components are removed as represented by the following Equation (11) by using the signal that is represented by Equation (6) and has undergone the downsampling processing. In Equation (11), $\theta_1$ represents phase rotation that is applied in order to maintain continuity of the phase between blocks.

$$s' = \tilde{s} - w_0 \theta_1 A \quad (11)$$

An estimated value of the data symbol, as represented by Equation (9), can be obtained by using the matrix represented by the above Equation (11).

Any processing may be performed as the frequency-time conversion processing performed by the frequency-time conversion unit 11. For example, decoding or demodulation may be directly performed by using the method described in the document "L. B. Nelson and H. V. Poor, "Iterative Multiuser Receivers for CDMA Channels: An EM-based Approach", IEEE Trans. on Commun., vol. 44, No. 12, December 1996, pp. 1700-1710" by using s' described above.

In the above first and second embodiments, an explanation has been given of an example where SC transmission is performed; however, the present invention is not limited to this and can be applied to transmission apparatuses and reception apparatuses of various systems including wired systems. Moreover, an explanation has been given of the DFT and IDFT processing; however, it is not limited thereto and FFT (Fast Fourier Transform) or IFFT (Inverse FFT) can also be used and two or more methods may be combined. Furthermore, the configurations of the transmission apparatus and the reception apparatus are not limited to the apparatus configurations illustrated in the embodiments.

As described above, in the present embodiment, the reception apparatus that receives SC block signals transmitted from the transmission apparatus described in the first embodiment is illustrated. With the communication system configured from the transmission apparatus in the first embodiment and the reception apparatus in the present embodiment, out-of-band spectrum can be reduced.

Moreover, in the present embodiment, an example in which a CP is inserted as a guard interval is illustrated; however, a guard interval other than a CP may be used. In such case, it is satisfactory if the symbols are arranged such that the head of the data symbol and the head of the guard interval are fixed symbols (or same-quadrant symbols).

Third Embodiment

Figure 13:
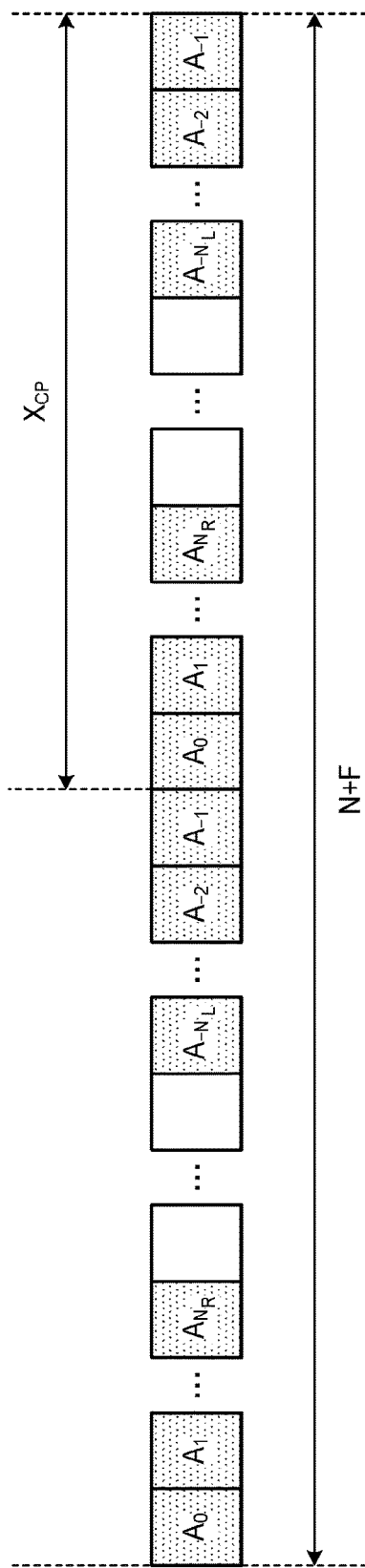
FIG. 13 is a diagram illustrating an example of the configuration of a block after the insertion of fixed symbols according to a third embodiment.

FIG. 13 is a diagram illustrating an example of the configuration of a block after the insertion of fixed symbols according to a third embodiment of the present invention. The configuration of the transmission apparatus in the present embodiment is similar to that of the transmission apparatus described in the first embodiment. Portions different from those in the first embodiment will be described below.

In the first embodiment, an example is described in which the same fixed symbols A or symbols in the same quadrant are inserted at predetermined positions. In the present embodiment, the fixed-symbol arrangement unit 2 inserts a fixed symbol sequence as illustrated in FIG. 13. In FIG. 13, blank portions indicate data symbols and $A_i$ indicates a fixed symbol. FIG. 13 illustrates the configurations of data symbols and fixed symbols for one block.

As illustrated in FIG. 13, the fixed symbol sequence in the present embodiment consists of $(N_L+N_R+1)$ fixed symbols that are arranged in the order of $[A_{-NL}, A_{-NL+1}, A_{-NL+2}, \ldots, A_{-1}, A_0, A_1, \ldots, A_{NR}]$. NL in the subscript of the fixed symbols indicates $N_L$ and NR in the subscript of the fixed symbols indicates $N_R$.

The arrangement order in the fixed symbol sequence is not limited to $[A_{-NL}, A_{-NL+1}, A_{-NL+2}, \ldots, A_{-1}, A_0, A_1, A_{NR}]$ and may be $[A_0, A_1, \ldots, A_{NR}, A_{-NL}, A_{-NL+1}, A_{-NL+2}, \ldots, A_{-1}]$. In the present embodiment, there is no limitation on the value of each of the fixed symbols $A_i$ of which the symbol sequence consists. After the fixed symbol sequence is arranged, if power normalization is to be performed, each A may be set to a different value. Moreover, $A_i$ may be set to be equal to zero, i.e., all the fixed symbols may be set to zero. For example, M-PSK (M-ary-Phase Shift Keying) symbols, M-QAM (M-ary Quadrature Amplitude Modulation) symbols, or the like may be used as $A_i$ or some of $A_i$ may be set to zero. Moreover, a sequence described in "D. C. Chu, "Polyphase Codes With Good Periodic Correlation Properties", IEEE Transactions on Information Theory, pp. 531-532, July 1972" may be used as the fixed symbol sequence.

Figure 14:
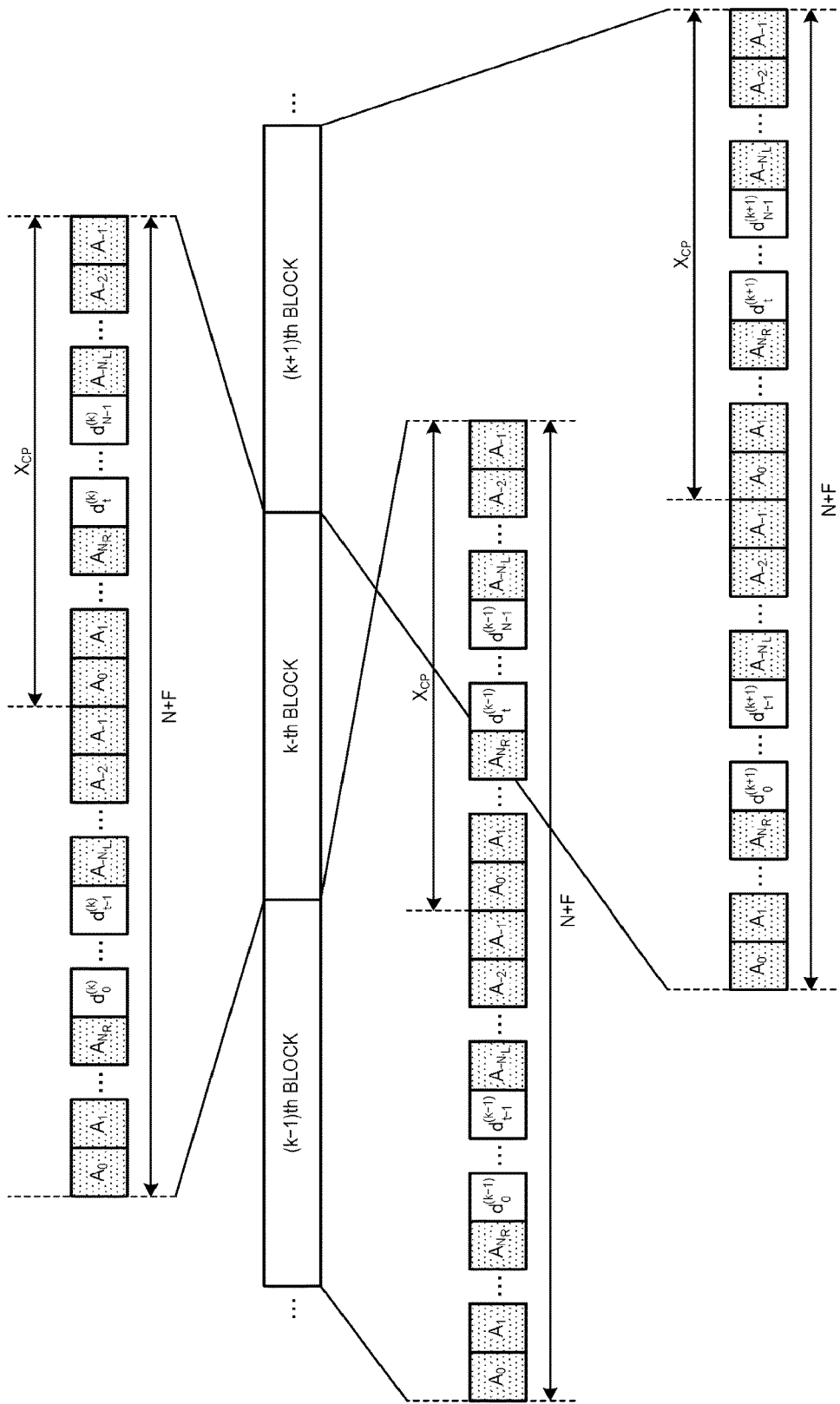
FIG. 14 is a diagram illustrating an example of the arrangement of a fixed symbol sequence in each block.

FIG. 14 is a diagram illustrating an example of the arrangement of the fixed symbol sequence in each block. In order to obtain the spectrum reduction effect, as illustrated in FIG. 14, the same fixed symbol sequence is used in all the blocks and the same fixed symbol is arranged at the same positions in the blocks. In FIG. 14, the i-th data symbol in the k-th block is represented by $d_i^{(k)}$. The method of arranging the fixed symbol sequence is as follows. $A_0$ in the fixed symbol sequence is arranged at the first position and at the $X_{CP}$-th position from the last position in the block. $X_{CP}$ will be described later.

The fixed symbols are arranged on the right and left sides of the reference position such that the fixed symbols in the fixed symbol sequence $[A_{-NL}, A_{-NL+1}, A_{-NL+2}, \ldots, A_{-1}, A_0, A_1, \ldots, A_{NR}]$ are arranged in the correct order without the relative order being changed with reference to the first position and the $X_{CP}$-th position from the last position in the block. Specifically, the position of $A_0$ in the fixed symbol sequence is defined as a reference position and the fixed symbol sequence is divided into a first symbol group, which is a symbol group $[A_{-NL}, A_{-NL+1}, A_{-NL+2}, \ldots, A_{-1}]$ on the left side of the reference position, and a second symbol group, which is a symbol group $[A_0, A_1, \ldots, A_{NR}]$ on the right side starting from the reference position. The second symbol group $[A_0, A_1, \ldots, A_{NR}]$ is arranged in the order that the symbols appear in this sentence starting from the first position in the block. The first symbol group $[A_{-NL}, A_{-NL+1}, A_{-NL+2}, \ldots, A_{-1}]$ is arranged in the order that the symbols appear in this sentence such that the last symbol of the first symbol group becomes the last symbol of the block. Moreover, the fixed symbol sequence $[A_{-NL}, A_{-NL+1}, A_{-NL+2}, \ldots, A_{-1}, A_0, A_1, \ldots, A_{NR}]$ is arranged in the order that the symbols appear in this sentence such that the $X_{CP}$-th position from the last position becomes $A_0$.

It is assumed that the symbol at the $X_{CP}$-th position from the last position, i.e., at the $(N+F-X_{CP}+1)$th position, is the symbol corresponding to the head of a portion to be copied as a CP in the time domain. In a similar manner to the first embodiment, because the first symbol in the block and the head symbol of the CP are substantially the same symbol, the present embodiment is an extension of the first embodiment. Accordingly, it is possible to maintain continuity of the phase and amplitude between blocks in a similar manner to the first embodiment. $X_{CP}$ can be calculated as $X_{CP}=N+F-\lambda\chi$ by using $\lambda$ and $\chi$, which are described in the first embodiment.

Symbols for one block in which a fixed symbol sequence is arranged as described above by the fixed-symbol arrangement unit 2 are input to the time-frequency conversion unit 3. The processing performed by the time-frequency conversion unit 3 is the time-frequency conversion processing in which the number of inputs is N+F and the number of outputs is N in a similar manner to Equation (1) in the first embodiment.

Figure 15:
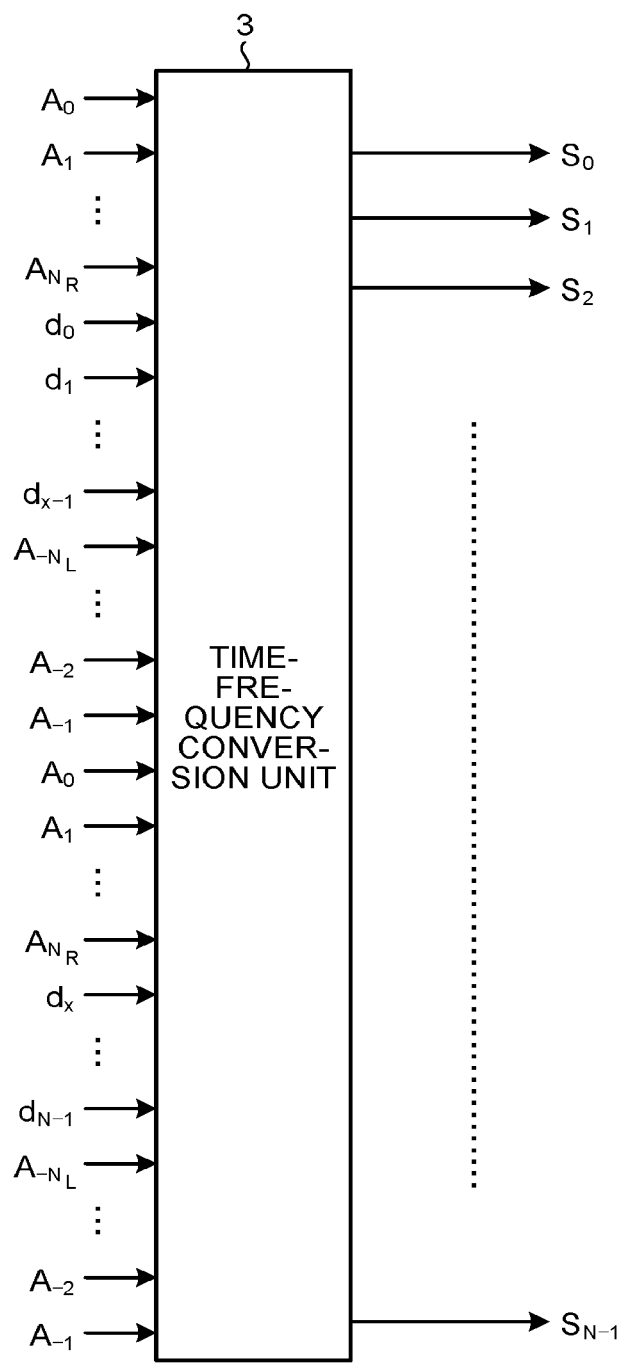
FIG. 15 is a diagram illustrating an example of input and output of a time-frequency conversion unit in the third embodiment.

FIG. 15 is a diagram illustrating an example of input and output of the time-frequency conversion unit 3 in the present embodiment. As illustrated in FIG. 15, the time domain signal $[A_0, A_1, \ldots, A_{NR}, d_0, d_1, \ldots, d_{x-1}, A_{31\ NL}, A_{-NL+1}, A_{-NL+2}, \ldots, A_{-1}, A_0, A_1, \ldots, A_{NR}, d_x, \ldots, d_{N-1}, A_{-NL}, A_{-NL+1}, \ldots, A_{-NL+2}, \ldots, A_{-1}]$ is converted to the frequency domain signal $[S_0, S_1, \ldots, S_{N-1}]$ by the time-frequency conversion unit 3. In FIG. 15, $d_1$ indicates a data symbol. The values of x in $d_{x-1}$ and $d_x$ are determined in accordance with $N_L$, $N_R$, and $X_{CP}$. The number of symbols in one block after the insertion of fixed symbols is N+F and the number of symbols before $X_{CP}$ is $N+F-X_{CP}$. Because $(N_L+N_R+1)$ symbols of $(N+F-X_{CP})$ symbols are fixed symbols, the number of data symbols before $X_{CP}$, i.e., x, is represented by $x=N+F-X_{CP}-(N_L+N_R+1)$.

In this example, it is assumed that $X_{CP}$ is a value that is sufficiently larger than $N_L+N_R+1$ so that the last fixed symbol sequence of the block does not overlap with the fixed symbol sequence located with reference to the $(N+F-X_{CP}+1)$th position.

Figure 16:
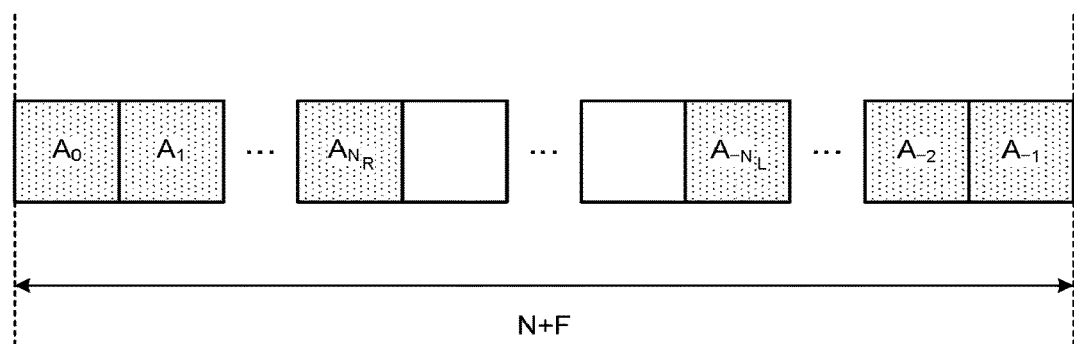
FIG. 16 is a diagram illustrating an example of the configuration of a block after the insertion of fixed symbols in the third embodiment in a case where a CP is not inserted.

Even when a CP is not inserted, the fixed symbol sequence can be inserted. FIG. 16 is a diagram illustrating an example of the configuration of a block after the insertion of a fixed symbol sequence in the present embodiment in a case where a CP is not inserted. When a CP is not inserted, $X_{CP}$ is equal to zero and the a fixed symbol sequence is arranged only at the head and the end of the block. In FIG. 16, F is equal to $(N_L+N_R+1)$.

Figure 17:
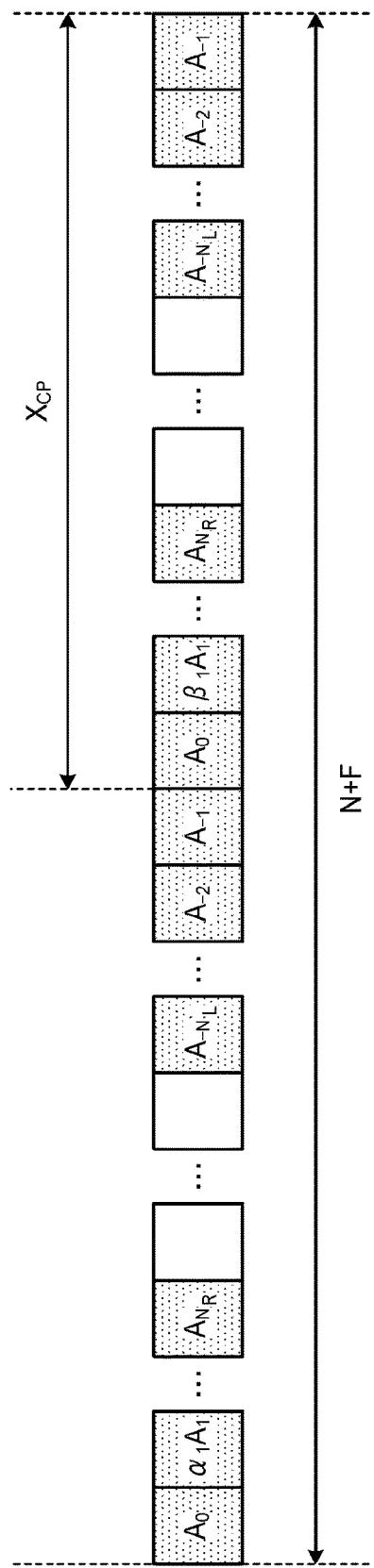
FIG. 17 is a diagram illustrating an example where different phase rotation and amplitude adjustment $\alpha_1$ and $\beta_1$ are applied to two fixed symbols $A_1$.

In order to reduce out-of-band spectrum, phase rotation and amplitude adjustment may be applied to the fixed symbols $A_1$. The methods of applying phase rotation and amplitude adjustment are similar to those in the first embodiment. FIG. 17 is a diagram illustrating an example where different phase rotation and amplitude adjustment $\alpha_1$ and $\beta_1$ are applied to two fixed symbols $A_1$.

In the above-described example, the symbols arranged at the first position and the $X_{CP}$-th position from the last position in the block are the same symbols $A_0$; however, these two symbols may be the same-quadrant symbols as described in the first embodiment. In this case, the symbol sequence arranged by using the $X_{CP}$-th position from the last position as a reference position is $[B_{-NL}, B_{-NL+1}, B_{-NL+2}, \ldots, B_{-1}, B_0, B_1, \ldots, B_{NR}]$ instead of $[A_{-NL}, A_{-NL+1}, A_{-NL+2}, \ldots, A_{-1}, A_0, A_1, \ldots, A_{NR}]$. $A_0$ and $B_0$ at the reference position are the same-quadrant symbols. The second symbol group $[A_0, A_1, \ldots, A_{NR}]$ is arranged by using the position that includes the first position in the block as a reference position and the first symbol group $[A_{-NL}, A_{-NL+1}, A_{-NL+2}, \ldots, A_{-1}]$ is arranged at the end of the block in a similar manner to the above.

As described above, in the present embodiment, the same fixed symbol sequence is arranged in each block immediately before and after the reference position in each block as a center. Accordingly, it is possible to maintain continuity of the phase and amplitude between blocks. Therefore, out-of-band spectrum can be reduced.

Fourth Embodiment

Next, an explanation will be given of a method of removing fixed symbols performed in the reception apparatus according to a fourth embodiment of the present invention. The reception apparatus in the present embodiment receives SC block signals into which a fixed symbol sequence described in the third embodiment is inserted. The configuration of the reception apparatus in the present embodiment is similar to that of the reception apparatus in the second embodiment. Portions different from those in the second embodiment will be described below.

In the present embodiment, the fixed-symbol removal unit 10 removes fixed symbols according to Equation (12) below. It is assumed that $I_F$ indicates the position at which each fixed symbol in the fixed symbol sequence is arranged, $k(i)$ indicates the number of the symbol number $i$ in the fixed symbol sequence, and $-N_L \leq k(i) \leq N_R$ is satisfied.

$$s' = \tilde{s} - \sum_{i \in I_F} w_i A_{k(i)} \qquad (12)$$

The frequency-time conversion unit 11 performs the frequency-time conversion processing by using Equation (9) described in the second embodiment. $W_F'$ used for frequency-time conversion is a matrix obtained by excluding the columns $i \in I_F$ from the matrix $W_F$.

As illustrated in Equation (13) below, the fixed symbol components may be removed in consideration of the phase rotation $\phi_{k(i)}$ applied for reducing out-of-band spectrum.

$$s' = \tilde{s} - \Sigma_{i \in I_F} w_i \phi_{k(i)} A_{k(i)} s \qquad (13)$$

As described above, in the present embodiment, an explanation has been given of the fixed symbol removal processing that is performed when receiving an SC block signal in which the same fixed symbol sequence is arranged in each block immediately before and after the reference position in each block as a center. By configuring the communication system from the transmission apparatus in the third embodiment and the reception apparatus in the present embodiment, out-of-band spectrum in the communication system can be reduced.

INDUSTRIAL APPLICABILITY

As described above, the transmission apparatus, the reception apparatus, and the communication system according to the present invention are useful for a communication system that performs SC block transmission and are particularly suitable for a communication system that performs CP insertion.

REFERENCE SIGNS LIST 1 symbol generation unit, 2 fixed-symbol arrangement unit, 3 time-frequency conversion unit, 4 waveform shaping filter unit, 5 guard-band insertion unit, 6 interpolation processing unit, 7 CP insertion unit, 8 CP removal unit, 9 interpolation-processing-removal and equalization-processing unit, 10 fixed-symbol removal unit, 11 frequency-time conversion unit, 12 demodulation and decoding unit, 61 oversampling processing unit, 62 IDFT unit, 91 DFT unit, 92 transmission-path estimation unit, 93 frequency-domain equalization unit, 94 downsampling processing unit.

The invention claimed is:

1. A transmission apparatus that transmits a block signal that includes N (N is an integer of one or larger) data symbols, the transmission apparatus comprising:
   a transmitter configured to:
   generate a data symbol;
   generate a block symbol by arranging the data symbol and F (F is an integer of two or larger) same-quadrant symbols, which become signal points in a same quadrant in a complex plane, such that the same-quadrant symbols are inserted at predetermined positions in a block signal;
   convert the block symbol to a frequency domain signal that includes N samples;
   perform interpolation processing on the frequency domain signal; and
   generate the block signal by inserting a Cyclic Prefix into a signal that has undergone the interpolation processing.

2. The transmission apparatus according to claim 1, wherein the transmitter is further configured to:
   arrange the same-quadrant symbols at a head of symbols that are copied as a Cyclic Prefix and a head of the block symbol, and
   perform the interpolation processing such that an interpolation point that is interpolated between a last symbol of the block symbol and a head symbol of the block symbol is added immediately after the last symbol.

3. The transmission apparatus according to claim 2, wherein the transmitter is further configured to:
   perform oversampling processing of increasing number of data points on the frequency domain signal, and
   perform inverse Fourier transform on a frequency domain signal that has undergone the oversampling processing.

4. The transmission apparatus according to claim 2, wherein the transmitter is further configured to:
   generate a symbol sequence that includes a plurality of symbols including the same-quadrant symbol, where a head of the block symbol being a first position and a head of symbols that are copied as a Cyclic Prefix being a second position, the symbol sequence including a first symbol group before a symbol position of the same-quadrant symbol and a second symbol group starting from the symbol position of the same-quadrant symbol;
   arrange the second symbol group such that the first position and the second position become a head of the second symbol group; and arrange the first symbol group such that a symbol immediately before the second position and the last symbol of the block symbol become a last symbol of the first symbol group.

5. The transmission apparatus according to claim 1, wherein the transmitter is further configured to:
insert a guard band into the frequency domain signal, and
perform the interpolation processing on the frequency domain signal into which a guard band has been inserted.

6. The transmission apparatus according to claim 1, wherein the transmitter is further configured to generate symbols having same phase and amplitude as the F same-quadrant symbols.

7. The transmission apparatus according to claim 1, wherein the transmitter is further configured to apply at least one of phase rotation and amplitude adjustment to each of the same-quadrant symbols.

8. A reception apparatus that receives, as a received signal, a signal transmitted from the transmission apparatus according to claim 1, the reception apparatus comprising:
a receiver configured to:
remove a Cyclic Prefix from the received signal;
convert the received signal from which a Cyclic Prefix has been removed to a frequency domain signal
perform processing in a reverse direction to interpolation processing performed on a transmission side on the frequency domain signal; and
perform equalization processing on a basis of the frequency domain signal;
remove, from a signal that includes N symbols and that has undergone the equalization processing, components corresponding to the same-quadrant symbols inserted at the predetermined positions;
convert a signal from which the same-quadrant symbols have been removed to a time domain signal; and
perform demodulation and decoding on a basis of the time domain signal.

9. A reception apparatus that receives, as a received signal, a signal transmitted from the transmission apparatus according to claim 3, the reception apparatus comprising:
a receiver configured to:
remove a Cyclic Prefix from the received signal;
perform DFT processing on the received signal from which a Cyclic Prefix has been removed;
perform transmission-path estimation on a basis of a signal that has undergone the DFT processing;
perform equalization processing on a basis of a result of the transmission-path estimation and a signal that has undergone the DFT processing;
perform downsampling processing on a signal that has undergone the equalization processing;
remove, from a signal that has undergone the downsampling processing, a component corresponding to the same-quadrant symbol inserted at the predetermined position;
convert a signal from which the same-quadrant symbol has been removed to a time domain signal; and
perform demodulation and decoding on a basis of the time domain signal.

10. A communication system comprising:
the transmission apparatus according to claim 1; and
a reception apparatus that receives, as a received signal, a signal transmitted from the transmission apparatus, wherein
the reception apparatus includes:
a receiver configured to:
remove a Cyclic Prefix from the received signal;
convert the received signal from which a Cyclic Prefix has been removed to a frequency domain signal;
perform processing in a reverse direction to interpolation processing performed on a transmission side on the frequency domain signal;
perform equalization processing on a basis of the frequency domain signal;
remove, from a signal that includes N symbols and that has undergone the equalization processing, components corresponding to the same-quadrant symbols inserted at the predetermined positions;
convert a signal from which the same-quadrant symbols have been removed to a time domain signal; and
perform demodulation and decoding on a basis of the time domain signal.

11. A communication system comprising:
the transmission apparatus according to claim 3; and
a reception apparatus that receives, as a received signal, a signal transmitted from the transmission apparatus, wherein
the reception apparatus includes:
a receiver configured to:
remove a Cyclic Prefix from the received signal;
perform DFT processing on the received signal from which a Cyclic Prefix has been removed;
perform transmission-path estimation on a basis of a signal that has undergone the DFT processing;
perform equalization processing on a basis of a result of the transmission-path estimation and a signal that has undergone the DFT processing;
perform downsampling processing on a signal that has undergone the equalization processing;
remove, from a signal that has undergone the downsampling processing, a component corresponding to the same-quadrant symbol inserted at the predetermined position;
convert a signal from which the same-quadrant symbol has been removed to a time domain signal; and
perform demodulation and decoding on a basis of the time domain signal.

12. A transmission apparatus that transmits a block signal that includes N (N is an integer of one or larger) data symbols, the transmission apparatus comprising:
a transmitter configured to:
generate a data symbol;
generate a block symbol by arranging the data symbol and F (F is an integer of one or larger) same-quadrant symbols, which become signal points in a same quadrant in a complex plane, such that the same-quadrant symbol is inserted at a predetermined position in a block signal;
convert the block symbol to a frequency domain signal that includes N samples; and
perform interpolation processing on the frequency domain signal.

13. The transmission apparatus according to claim 12, wherein the transmitter is further configured to:
generate a symbol sequence that includes a plurality of symbols including the same-quadrant symbol;
divide the symbol sequence into a first symbol group, which includes symbols from a head position of the symbol sequence to a position that is immediately before a reference position, and a second symbol group, which includes symbols from a symbol at the reference position of the symbol sequence to an end of the symbol sequence;

arrange the second symbol group such that a head of the block symbol becomes a head of the second symbol group; and arrange the first symbol group such that a last symbol of the block symbol becomes a last symbol of the first symbol group.

14. A communication system comprising:

a transmission apparatus that transmits a block signal that includes N (N is an integer of one or larger) data symbols, the transmission apparatus including:

a transmitter configured to:

generate a data symbol;

generate a block symbol by arranging the data symbol and F (F is an integer of two or larger) same-quadrant symbols, which become signal points in a same quadrant in a complex plane, such that the same-quadrant symbols are inserted at predetermined positions in a block signal;

convert the block symbol to a frequency domain signal that includes N samples;

perform interpolation processing on the frequency domain signal; and generate the block signal by inserting a Cyclic Prefix into a signal that has undergone the interpolation processing; and a reception apparatus according to claim 8.

15. A communication system comprising:

a transmission apparatus that transmits a block signal that includes N (N is an integer of one or larger) data symbols, the transmission apparatus including:

a transmitter configured to:

generate a data symbol;

generate a block symbol by arranging the data symbol and F (F is an integer of two or larger) same-quadrant symbols, which become signal points in a same quadrant in a complex plane, such that the same-quadrant symbols are inserted at predetermined positions in a block signal;

convert the block symbol to a frequency domain signal that includes N samples;

perform interpolation processing on the frequency domain signal; and generate the block signal by inserting a Cyclic Prefix into a signal that has undergone the interpolation processing, perform oversampling processing of increasing number of data points on the frequency domain signal, and perform inverse Fourier transform on a frequency domain signal that has undergone the oversampling processing; and a reception apparatus according to claim 9.

* * * * *